United States Patent Office 2,753,739
Patented July 10, 1956

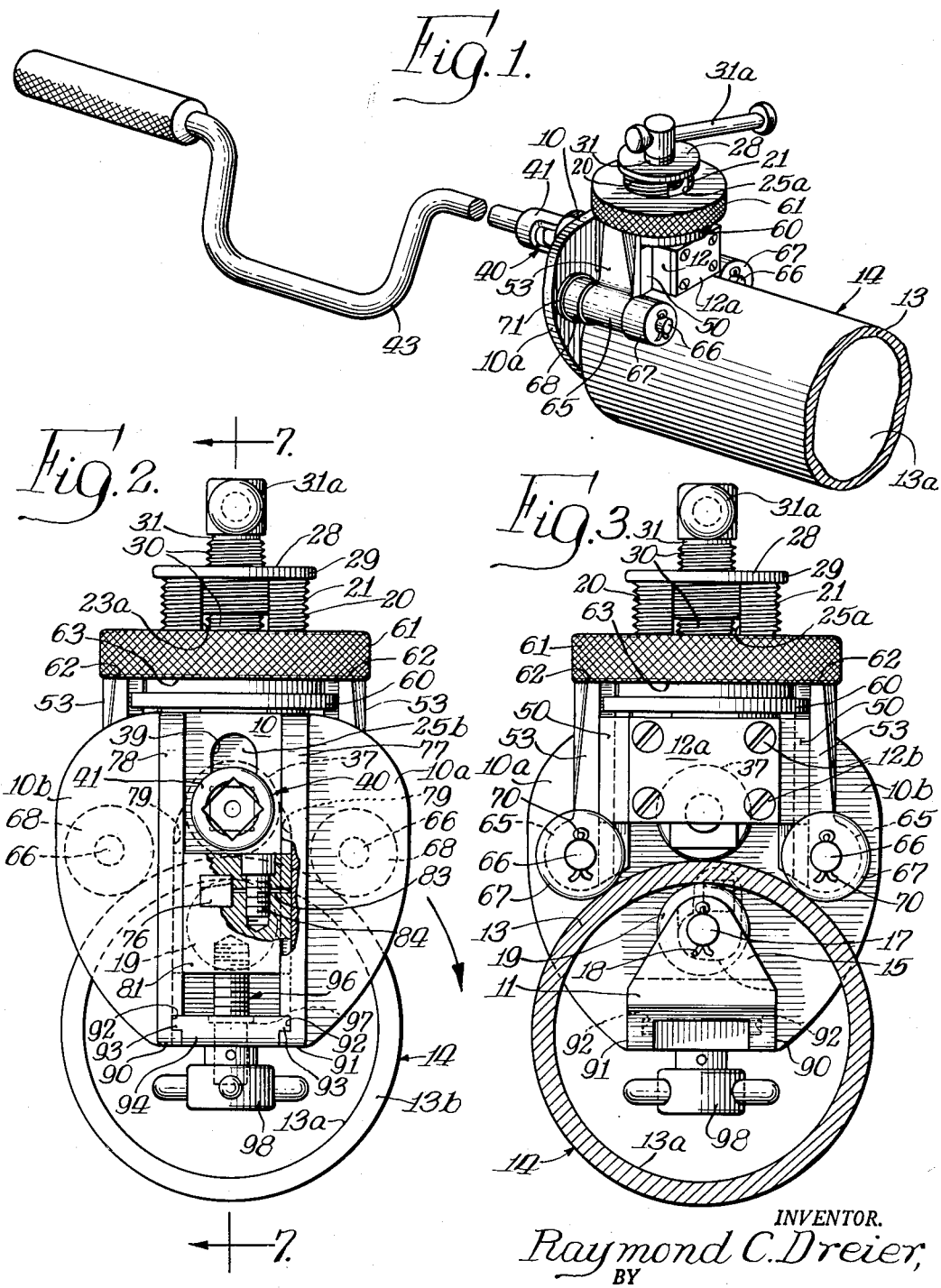

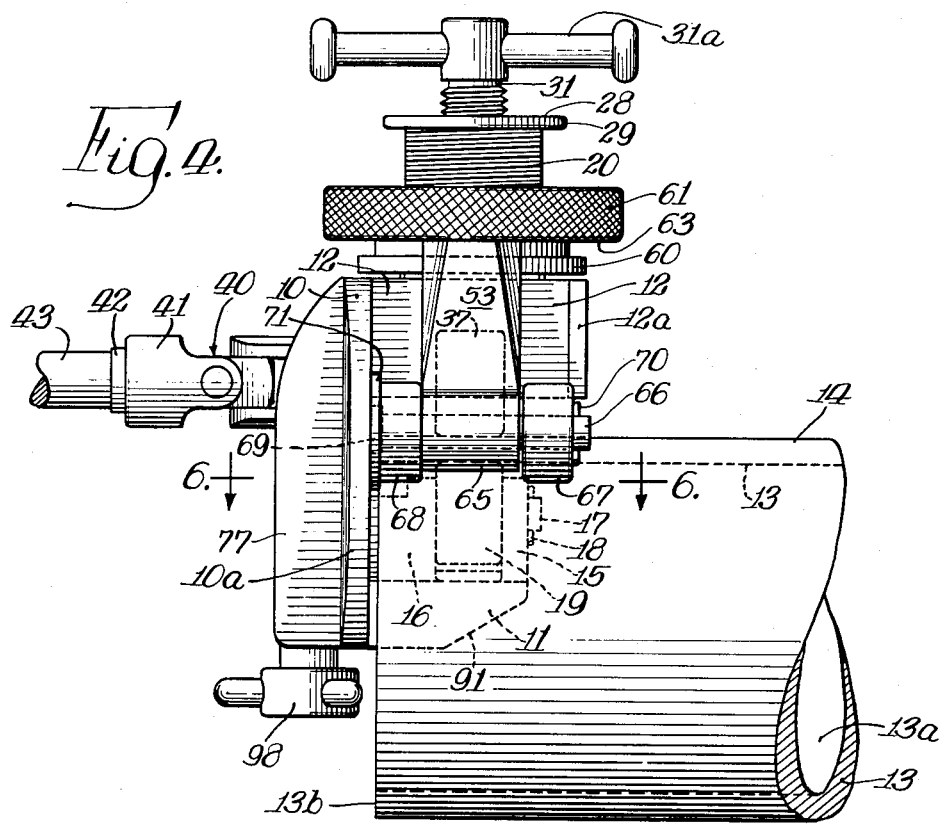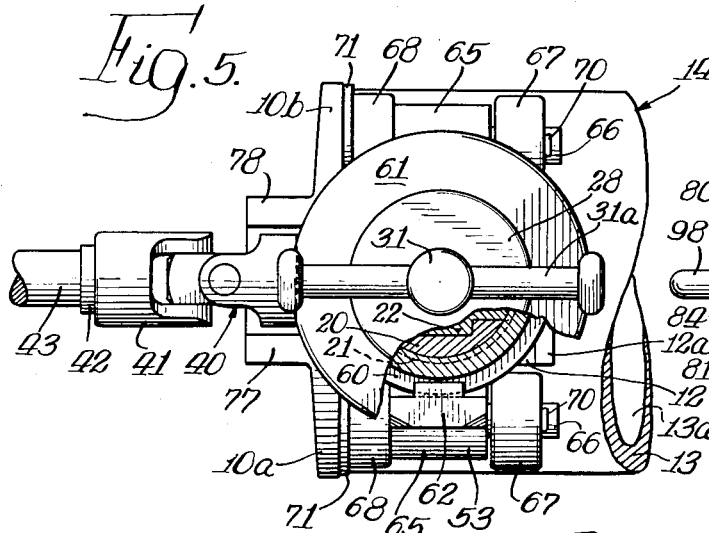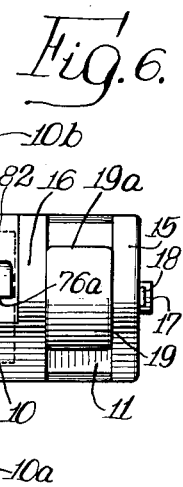

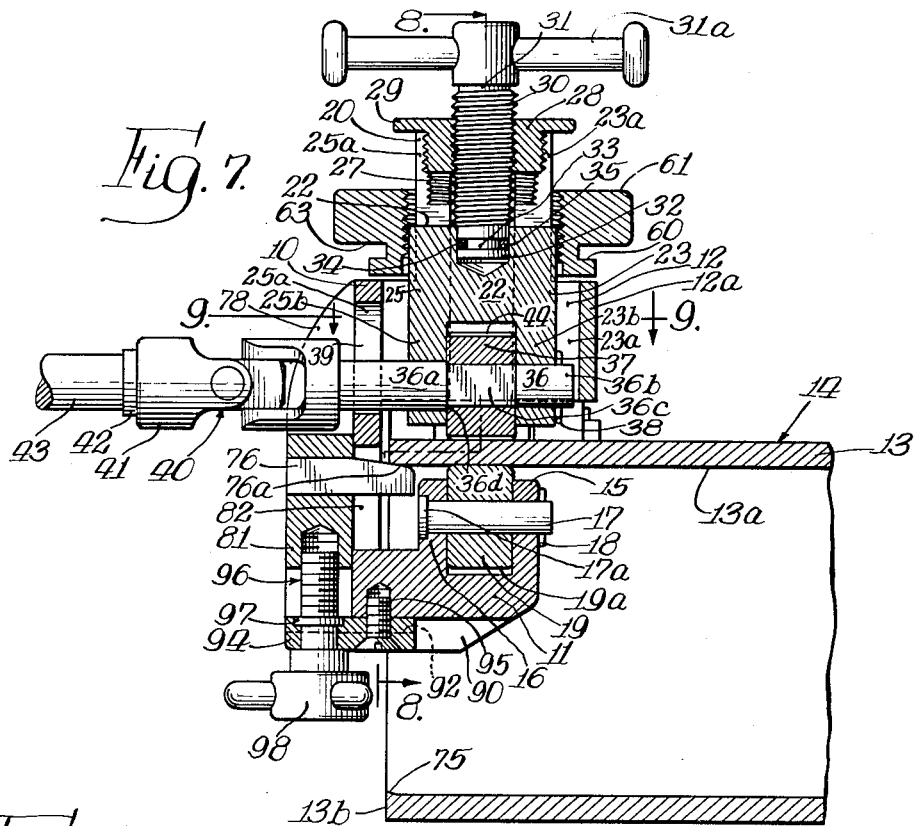
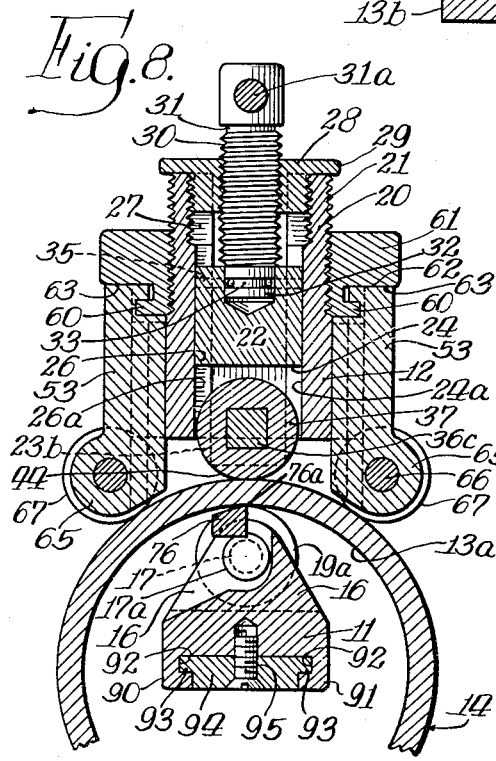
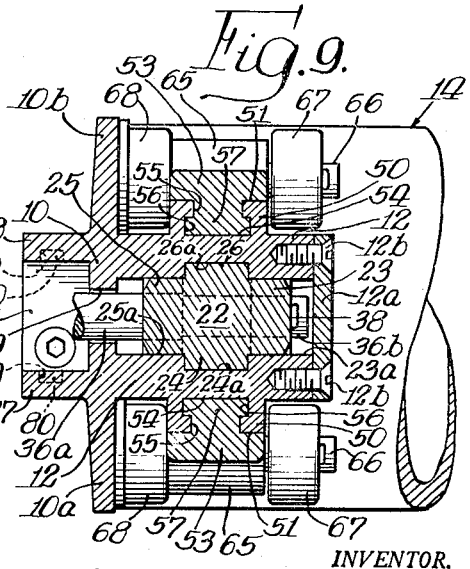

2,753,739

TRAVELING TOOL

Raymond C. Dreier, Chicago, Ill., assignor, by mesne assignments, to Dreier Brothers, Inc., Chicago, Ill., a corporation of Illinois Application September 11, 1952, Serial No. 309,083

7 Claims. (Cl. 77—2)

The present invention relates to reamers for cutting or shaving material from metallic bodies and more particularly to a traveling reamer-like cutting or shaving tool for shaving material from walls of metal or the like.

In the practice of the usual methods of cutting metal plates or metal walls, such as the wall of a pipe, a rough edge, called a burr, remains on the severed end of the metallic body after the cutting operation has been completed. Heretofore, the removal of these burrs has been time consuming and when it has been necessary to carry on the work in the field, such as is usually the case in the plumbing industry for example, it has normally been necessary to remove the burrs from large pipes by hand operation of a file because the use of power driven grinders often is uneconomical or impossible because of restricted working space and other adverse working conditions. One of the principal objects of the present invention is to solve this problem by the provision of a small and very compact hand tool which may be quickly fitted onto the edge of a freshly severed plate or onto the end of a severed pipe and, by the mere turning of a crank or the like, be driven circumferentially around the end of the pipe to shave and remove burrs from the inside surface thereof, or to be driven along the edge of a severed plate, as the case may be, to remove metal burrs and the like therefrom. A further object of the present invention is to provide a traveling tool of the aforesaid nature which is adapted to shave material from walls of different thicknesses and different radii of curvatures, thereby rendering the tool useful in a wide variety of applications and circumstances. Other objects and advantages of the tool of the invention will be apparent to those skilled in the art upon reading the present disclosure.

The nature of the invention will be understood from the following specification, taken with the accompanying drawings in which there is shown a preferred form of traveling cutting or shaving tool embodying the present invention. In the drawings:

Fig. 1 is a perspective view of the tool arranged on the end of a pipe and in operative position ready to be driven by a crank around the pipe to remove any burrs that may be present on the inner edge of the pipe's end;

Fig. 2 is a front elevational view of the tool on the pipe;

Fig. 3 is an elevational view of the back of the tool, the pipe upon which is it mounted being shown in cross-section;

Fig. 4 is a side elevation of the tool arranged on the pipe;

Fig. 5 is a top view thereof;

Fig. 6 is a cross-sectional view of the tool taken substantially along the line 6—6 in Fig. 4, the pipe being omitted from this view for clearness of illustration;

Fig. 7 is a vertical cross-sectional view taken substantially along the line 7—7 in Fig. 2;

Fig. 8 is a similar view taken substantially along the line 8—8 in Fig. 7 in order to show the principal working parts of the tool; and Fig. 9 is a horizontal cross-section taken along the line 9—9 in Fig. 7.

As shown in the drawings, the traveling tool assembly of the present invention has, as its base element, a generally C-shaped rigid frame comprising an upstanding intermediate leg portion 10 and two laterally extending leg portions 11 and 12. These legs are integrally joined and form a unitary frame. As seen in Figs 4 and 7, the leg portions 11 and 12 extend to the right from the upstanding leg portion 10 and define a recess therebetween which is adapted to receive the edge portion of a wall of metal or the like, such as the end portion of a circumferential section of a wall 13 of a pipe 14. The legs 11 and 12 are parallel, the leg 11 extending outwardly from the lower end of the upstanding leg 10 and the leg 12 extending outwardly from the upper end of the leg 10. The longitudinal center lines of the legs 10, 11 and 12 define the plane upon which Fig. 7 is taken, this plane being the vertical center plane of the entire tool assembly.

The lower leg 11 of the frame is very rigidly constructed and has formed on its upper surface adjacent its outer end portion two upstanding, spaced apart ears 15 and 16 which extend upwardly into the recess defined by the two legs 11 and 12. The two upstanding ears 15 and 16 are provided with aligned apertures which have journaled therein a roller mounting pin 17, the axis of which lies in the previously mentioned vertical center plane of the tool assembly. The left end of this pin, as seen in Fig. 7, has a flat head 17a formed thereon which is received in a counterbore in the wall of the inner upstanding ear 16 (Figs. 7 and 8) so as to avoid interfering with the movement of a cutting tool that will be referred to presently. The roller mounting pin may be secured in the apertures in the ears 15 and 16 by means of a cotter key 18 passed through its outer end, as shown in Fig. 7. A single guide roller 19, having a smooth peripheral surface 19a, is rotatably mounted on the pin 17 between the ears 15 and 16. This freely rotating roller 19 is adapted to engage and roll circumferentially around the inner surface 13a of the pipe 14, as will be more fully explained below.

The upper leg 12 of the C-shaped frame, like the lower leg 11, is also very rigidly constructed and is provided on its upper side, directly above the roller 19, with an upstanding circular boss 20 having an axis that lies in the previously mentioned vertical center plane of the tool assembly. This upstanding boss 20 is externally threaded as at 21, and a vertical guide passage is formed therein which extends downwardly through the boss and through the leg 12 slidably to receive a core 22. The core 22 has a cross-shaped cross-section, as best seen in Fig. 9, the vertical guide passage formed in the boss 20 and in the upper leg 12 of the frame being of corresponding configuration to receive the core. The core 22 thus comprises a block of metal or the like having outwardly extending rectangular portions on each of its four sides. These portions are designated as 23, 24, 25 and 26 in the drawings (best seen in Fig. 9), the portions 23 and 25, and the portions 24 and 26, being on opposite sides of the core respectively. Parallel vertical slots 23a, 24a, 25a and 26a are formed on the inner walls of the vertical guide passage in the upper leg 12 and in the boss 18 to slidably receive the portions 23, 24, 25 and 26 of the core, respectively. The slot 25a extends through the wall of the boss (Fig. 3), and the slot 23a extends through the outer end of the upper leg 12 of the frame (Fig. 9) and through the wall of the boss (Fig. 2). In order to strengthen this outer end of the leg 12 of the frame it is capped by a rectangular plate 12a which may be secured to the leg on opposite sides of the slot 23a by means of screws 12b (Fig. 9).

The upper end of the vertical core guiding passage is internally threaded at 27 in the boss 20 to receive an externally threaded plug 28 which has a peripheral shoulder 29 formed thereon and arranged to rest on the upper end of the boss. The plug 28 is provided with a centrally located aperture which is internally threaded to receive an externally threaded portion 30 of a shaft 31. The lower end of the shaft 31 is provided with a reduced diameter portion 32 which is rotatably secured in a bore of corresponding size in the upper end of the core 22. In order rotatably to retain the lower end of the shaft 31 in this bore in the upper end of the core 22, a recessed circular groove 33 is formed around the peripheral surface of the lower end portion of the shaft 31. This groove receives on its opposite sides two pins 34 and 35 (Fig. 7) which lie in a pair of parallel passages that extend through the core 22 from one side to the other (Fig. 8) and intersect the bore in the upper end of the core. With the lower end of the shaft 31 thus rotatably secured by the pins 34 and 35 in the upper end of the core, it will be understood that when the shaft is rotated in a clockwise direction, for example, the core will be moved downwardly in the vertical guide passage formed in the boss 20 and the upper leg 12 of the frame. Similarly, when the shaft 31 is rotated in a counter-clockwise direction the core 22 will be raised in the passage. A handle assembly 31a, of any suitable construction, may be fixed to the upper end of the shaft 31 so that the shaft may be rotated, and the core 22 thus raised or lowered, by manipulation with the fingers.

The side portions 23 and 25 of the core 22 extend downwardly from the body proper of the core to form two ears 23b and 25b which contain aligned apertures for rotatably journaling a traction wheel drive shaft 36 that has a traction wheel 37 mounted thereon between the ears. The drive shaft 36 has a portion 36a of circular cross-section which rides in the ear 25b and it has an outer end portion 36b of reduced diameter which rides in the ear 23b. The intermediate portion 36c of the shaft, which lies between the ears 25b and 23c, is of square cross-section (Fig. 8) and carries the traction wheel 37 which has a square aperture therein of a size corresponding to that of portion 36c of the shaft. It will be understood that the traction wheel 37, rotatably speaking, is fixed on the shaft 36 and that the shaft with the traction wheel thereon may be rotated in the ears 23b and 25b.

In cross-sectional dimension, the intermediate portion 36c of the shaft 36, when measured diagonally across its cross-section from one corner to the other, is substantially equal to the diameter of portion 36a of the shaft. Thus, the junction of the circular portion 36a of the shaft with the square intermediate portion thereof provides a plurality of shoulders 36d against which the left-hand side of the traction wheel 37 rests (as viewed in Fig. 7). The other side of the traction wheel rides against the inside surface of the ear 23b and it will accordingly be seen that this prevents axial movement of the shaft 36 toward the right as viewed in Fig. 7. Axial movement of the shaft 36 toward the left, on the other hand, is prevented by a cotter pin 38 which is passed through the extremity of the reduced end portion 36b of the shaft where it protrudes through the ear 23b. Normally this end of the shaft and the cotter pin are largely concealed by the removable plate 12a on the outer end of the leg 12 of the frame of the tool assembly.

The large diameter portion 36a of the traction wheel drive shaft 36 extends outwardly through an oblong opening 39 formed in the leg 10 of the frame and has mounted thereon a universal joint designated generally by the numeral 40. This universal joint may be of any suitable construction and its outer element 41 may be provided with a suitably shaped socket for removably receiving the end 42 of a crank 43. Turning the crank 43 will, of course, result in rotation of the shaft 36 and the traction wheel 37 thereon.

The traction wheel 37 has a diameter substantially equal to the cross-sectional width of the core 22 and has a knurled peripheral surface 44 which extends below the lowermost edges of the ears 23b and 25b of the core 22.

Thus, when the shaft 31 is rotated in a clockwise direction to lower the core 22 in the vertical guide passage in the leg 12 of the frame and the boss 18 thereon, this knurled peripheral surface 44 of the traction wheel 37 is brought forcefully into contact with the outer surface of the pipe 14 or the like, at a position directly opposite the place of contact of the roller 19 with the inner surface 13a of the wall 13 of the pipe. The wall 13 of the pipe is thus gripped between the roller 19 and the knurled drive roller 37.

On each of the outer sides of the upper leg 12 of the frame there is formed a block-like protrusion 50 (Figs. 1, 3 and 9) having thereon a vertical planar outer face 51 (Fig. 9). In each of these faces there is milled or otherwise cut a vertical groove for slidably receiving an adjustably movable guide roller mounting member 53. Each of the grooves has a base or bottom wall 54 parallel to the face 51 of the block 50 and opposed side walls 55 which, near the base wall 54, are recessed as at 56. Each of the grooves is thus a modified dove-tail type slot wherein the base wall 54 thereof is wider than the opening of the groove at the face 51 of the block 50. The inner side of each of the guide roller mounting members 51 is provided with a planar surface lying against and adapted to slide vertically along the face 51 of the block 50. Formed on this inner side of each guide roller mounting member is a longitudinal tongue 57 which corresponds in cross-sectional shape to the cross-section of the corresponding groove in the block 50. The dimensions of each tongue 57 are only slightly smaller than those of the corresponding groove so that the tongue may slide up and down in the groove with the movement of the guide roller mounting member 53 along the face 51 of the block 50. The construction of the grooves and the tongues 57 on the guide roller mounting members 53 is such that the mounting members may be moved up and down but cannot be pulled outwardly away from the faces 51 of the blocks 50.

Adjacent their upper ends, each of the guide roller mounting members 53 is provided on its inner side with a transverse slot which receives a peripheral shoulder 60 formed on the lower side of a circular adjusting nut 61 that is threaded on the external threads 21 of the boss 20. The upper-most ends 62 (Fig. 8) of the guide roller mounting members 53, on the other hand, slidably engage the under side 63 of the main body portion of the circular adjusting nut 61. If desired, the outermost periphery of the main body portion of the circular adjusting nut 61 may be knurled to permit easy manipulation of the nut with the fingers.

The lower end of each of the guide roller mounting members 53 is provided with a reinforced journal portion 65 in which there is mounted a shaft 66. The shafts 66 protrude from the opposite ends of the journal portions 65 of the guide roller mounting members and each shaft has mounted on its opposite protruding ends a pair of guide rollers 67 and 68. These guide rollers are equidistant from the roller 19 and are equally spaced from the vertical center plane of the tool assembly, as will be seen in the drawings.

The upstanding intermediate leg 10 of the frame of the tool is flared out on each of its sides to provide reinforcing flanges 10a and 10b. The surfaces of these flanges facing the guide roller mounting members 53 are planar and are slidably engaged by flat heads 69 that are formed on the adjacent end of each of the shafts 66 and recessed in one side of each of the guide rollers 68, as best seen in Fig. 4. The other end of each shaft 66 is apertured and provided with a cotter-pin 70 which retains the guide roller 67 on the shaft. Endwise movement of each of the shafts 66 is prevented by reason of the fact that the head 69 thereon is in sliding engagement with the flanges 10a or 10b of the leg 10 of the frame, as the case may be, and is recessed in the face of one of the guide rollers 68 next adjacent the flange 10a or 10b.

It will be seen, particularly in Figs. 1 and 4, that each of the guide rollers 68 is provided with a peripheral flange 71 next adjacent the flange 10a or 10b of the leg 10 of the frame. The purpose of these flanges 71 will be more fully explained below.

From the foregoing description it will be understood, for example, that clockwise rotation of the adjusting nut 61 on the external threads 21 of the boss 20 will cause the nut to travel downwardly on the threads 21 and thus simultaneously move the guide roller mounting members 53 downwardly, the tongue 57 of each of the mounting members sliding in its retaining groove in one of the blocks 50 formed on the sides of the leg 12. When the tool assembly is mounted on a metallic plate or on the wall of a pipe, with the plate or wall received in the recess between the legs 11 and 12 of the frame, downward movement of the roller mounting members 53 will bring the guide rollers 67 and 68 simultaneously into contact with the outer or upper surface of the wall. In this condition the flange 71 on each of the guide rollers 68 will overlap the edge 13b of the wall (Fig. 5). The guide roller 19 and the guide rollers 67 and 68 will thus be in engagement with the opposite sides of the wall and will support the tool assembly thereon and permit the assembly to be moved on the guide rollers along the wall, or circumferentially around the wall if the wall is curved as in the present drawings, the flanges 71 on the guide rollers 68 serving to guide the tool in its travel. When the tool assembly has thus been mounted on a wall of metal or the like, the traction wheel 37 may be lowered into gripping engagement with the outer surface of the wall by clockwise movement of the shaft 31, as previously explained. When the traction wheel is thus forced downwardly against the outer surface of the wall, the traction wheel and the guide roller 19, which are in opposed position, will forcefully grip the wall therebetween, and operation of the crank 43 thereafter will cause the traction wheel to rotate and to propel the tool assembly around the end of the pipe 14 or along the edge of the wall on the guide rollers 17, 67 and 68.

In order that material such as burrs 75 (Fig. 7) on the inner edge of the wall 13 of the pipe or other wall may be removed during the movement of the tool assembly as just explained, the tool assembly is provided with an adjustable cutting tool 76. A preferred means for adjustably mounting this cutting tool 76 on the frame of the tool assembly is best shown in Figs. 2 and 7. As there shown, the rear side of the leg 10 of the frame is provided with two spaced-apart parallel outwardly extending flanges 77 and 78. The inner sides of these flanges 77 and 78 are provided with opposed parallel grooves 79 (Figs. 2 and 9) which slidably receive tongues 80 formed on the opposite sides of a tool holding block 81 that is movably disposed between the flanges 77 and 78. This tool holding block 81 is provided with a square opening which receives a correspondingly shaped base end of the cutting tool 76, the cutting tool extending from the block 81 through an oblong opening 82 formed in the leg 10 of the frame (Figs. 6 and 7) and into position adjacent the guide roller 19 and in contact with the metallic wall 13 in the recess defined by the legs 11 and 12 of the frame of the tool.

In order to retain the cutting tool 76 tightly in the tool holding block 81, the tool block 81 is split as at 83 (Fig. 2) from one of its lateral edges inwardly to the square tool receiving aperture therein, and a stud 84 is threaded downwardly from the top of the block through the split at 83 and into the lower portion of the block. Loosening of the stud 84 will permit the split 83 in the block to spread slightly to increase the size of the square aperture in which the base end of the cutting tool 76 is retained, thus permitting removal of the cutting tool. Tightening of the stud 84, on the other hand, will close the gap of the split 83, reducing slightly the size of the square aperture and firmly securing the base of the cutting tool 76 in the tool holding block 81.

Means are provided for adjustably moving the tool holding block 81 upwardly and downwardly for the purpose of raising and lowering the cutting tool 76. To this end two parallel downwardly extending flanges 90 and 91 are formed horizontally on the bottom of the lower leg 11 of the frame (Figs. 2, 7 and 8). The inner faces of these flanges are each provided with a slot 92 adapted to receive tongues 93 formed on the opposite sides of a base plate 94 that is slidably arranged between the flanges 90 and 91, as best seen in Figs. 2 and 8. This base plate 94 is normally secured in fixed position between the flanges 90 and 91 by means of a counters-unk screw 95 (Figs. 7 and 8) which is threaded through the base plate 94 and into the under side of the lower leg 11 of the frame.

An adjusting screw, shown generally at 96, is vertically journalled in the base plate 94 directly beneath the tool holding block 81, the adjusting screw 96 being provided with a shoulder 97 that rotatably rests in a counter-bore in the upper surface of the base plate 94. The lower end of the adjusting screw 96 protrudes from the lower surface of the base plate 94 and has fixedly mounted thereon a manipulating head 98 so constructed and arranged as to be easily turned by the fingers and thus cause rotation of the screw 96. The shoulder 97 on the adjusting screw 96 and the upper surface of the manipulating head 98 engage the opposite surfaces of the base plate 94 and prevent axial movement of the adjusting screw 96. The upper portion of the adjusting screw 96 is externally threaded and is received in an internally threaded bore in the bottom of the tool holding block 81. It will thus be understood that rotation of the adjusting screw 96 will raise or lower the tool holding block 81 and bring the cutting edge 76a of the cutting tool 76 into cutting engagement with the inner surface 13a of the wall 13 of the pipe 14 or the surface of any other wall upon which the present tool assembly may be mounted.

Because of its very compact construction, the present tool may be constructed in a size such that it may be fitted conveniently into ordinary portable tool boxes and may be carried out into the field where its use results in a great saving of time and labor. If, for example, a plumber desires to remove burrs from the inside of the end of a severed pipe, such as the pipe 14 in the drawings, the plumber may quickly slip the present tool onto the end of the pipe in the manner shown in the drawings and by means of his fingers operate the large adjusting nut 61 to bring the guide rollers 67 and 68 down into supporting contact with the outside surface of the pipe and the single guide roller 19 into supporting engagement with the inner surface of the pipe. The shaft 31 is then turned by means of the handle 31a to lower the traction wheel 37 (which may be knurled if desired) into forceful contact with the outside surface of the pipe so that the wall of the pipe is gripped between the single inside roller 19 and the traction wheel 37. The cutting tool adjusting screw 96 is then turned by means of the manipulating head or handle 98 in order to raise the cutting tool 76 into proper cutting contact with the wall of the pipe, and the crank 43 is thereupon inserted into the socket element 41 of the universal joint assembly 40 and turned to propel the entire tool assembly around the pipe. During this travel the cutting tool 76 will shave material from the wall of the pipe and, if desired, the tool 76 can be raised slightly at the end of each circuit around the pipe so that the burrs or other material being removed may be shaved in successive cuts. The depth of cut at any particular time may, of course, be controlled by manipulation of the handle or head 98.

Due to the physical arrangement of parts and due to the fact that the driving or traction wheel 37 and the support rollers 67 and 68 may be raised and lowered independently with respect to the support roller 19, it will be immediately apparent that the present tool may be used to cut or shave material from both planar and curved walls of different thicknesses. Furthermore, the present tool, for the same reason, may be used on curved walls having different radii of curvature, such as pipes having different diameters.

Another practical advantage in the use of the present tool arises from the ease with which it may be disassembled and, thus, the ease with which parts may be repaired or replaced. In order to disassemble the tool, the plate 12a may first be removed, the cotter pin 38 removed from the end of the traction wheel drive shaft 36, and the shaft then pulled out of the tool assembly toward the left, as viewed in Fig. 7. In this operation the drive wheel 37 slides off the shaft 36. The threaded plug 28 is then removed from the top of the boss 20 and the shaft 31 with the core 22 thereon is free to be lifted out the top of the boss. The large adjusting nut 61 is then turned off the external threads 21 of the boss 29 and this operation carries the guide roller mounting members 53 upwardly out of the grooves in the blocks 50 on the sides of the upper leg 12 of the frame. With the guide roller mounting members 53 thus removed, the guide rollers thereon may be removed in the obvious way. The cutting tool supporting means is also easily disassembled. The stud 84 may be first loosened to permit withdrawal of the cutting tool 76 from the block 81, and the adjusting screw 96 may then be turned until it is disengaged from the threaded bore in the bottom of the block. The countersunk screw 95 is then removed from the bottom of the base plate 94 which permits the base plate to be slid endwise out of the flanges 90, 91 and the block 81 to be slid downwardly from between the vertical flanges 77, 78 on the back of the leg 10 of the frame. In order to assemble the tool, the steps just outlined are taken in their inverse order.

The foregoing description has been given for clearness of understanding only, and no unnecessary limitations should be inferred therefrom, for it will be apparent to those skilled in the art that various changes may be made in the construction shown without departing from the spirit and scope of the appended claims.

I claim:

1. A traveling tool for circumferentially shaving material from the wall of a hollow cylindrical object, such as a pipe or the like, comprising a frame, a first roller on said frame constructed and arranged to engage and roll circumferentially around the inside surface of a circumferential section of the cylindrical wall of said object, a pair of spaced apart guide rollers on said frame respectively constructed and arranged for rolling engagement with the outside surface of said circumferential section at locations angularly displaced with respect to the location of said first roller, said first roller and said pair of guide rollers being adapted cooperatively to support said frame on said wall for circumferential movement thereabout, a traction wheel located on said frame intermediate said pair of guide rollers and directly opposite said first roller, means for selectively moving said traction wheel toward said first roller and forcefully into contact with said outside surface of said wall while said frame is supported upon said wall by said first roller and said pair of guide rollers, said wall being thereby forcefully clamped directly between said first roller and said traction wheel, means for rotating said traction wheel to propel said frame about said wall on said rollers, and a cutting tool on said frame engageable with said wall for shaving material from the wall during movement of said frame thereon.

2. A traveling tool for shaving material from a wall of metal or the like comprising, a generally C-shaped frame having first and second laterally extending leg portions defining a recess therebetween, said frame being constructed and arranged to receive an edge portion of said wall in said recess, a roller on said first leg adapted to engage and ride on one side of said wall, a pair of spaced apart guide rollers on said second leg respectively constructed and arranged to ride upon the opposite side of said wall ahead of and behind the location of said first mentioned roller, said first mentioned roller and said pair of guide rollers being adapted cooperatively to support said frame on said wall for movement along the edge thereof, a traction wheel located on said frame intermediate said guide rollers and directly opposite said first mentioned roller, means for selectively moving said traction wheel toward said first mentioned roller and forcefully into contact with said opposite side of said wall while said frame is supported upon said wall by said first mentioned roller and said pair of guide rollers, said wall being thereby forcefully gripped directly between said first mentioned roller and said traction wheel, means for rotating said traction wheel to propel said frame along said wall on said rollers, and a cutting tool on said frame engageable with said wall for shaving material from said wall during movement of said frame thereon.

3. A traveling tool for shaving material from the edge portion of a metal wall or the like, comprising a frame, a first roller on said frame constructed and arranged to engage and ride along one side of said wall, a pair of spaced apart guide rollers on said frame respectively constructed and arranged to engage and ride along the opposite side of said wall ahead of and behind the location of said first roller, said first roller and said pair of guide rollers being adapted cooperatively to support said frame on said wall for movement along said edge portion thereof, a traction wheel on said frame intermediate said pair of guide rollers and directly opposite said first roller, means for selectively moving said traction wheel toward said first mentioned roller and forcefully into contact with said opposite side of said wall while said frame is supported upon said wall by said first mentioned roller and said pair of guide rollers, said wall being thereby forcefully gripped directly between said first mentioned roller and said traction wheel, means for rotating said traction wheel to propel said frame along said wall on said rollers, and a cutting tool on said frame engageable with said wall for shaving material from said wall during movement of said frame thereon.

4. A traveling tool for shaving material from a wall of metal or the like comprising, a generally C-shaped frame having first and second laterally extending leg portions defining a recess therebetween, said frame being constructed and arranged to receive an edge portion of said wall in said recess, a roller on said first leg adapted to engage and ride on one side of said wall in said recess, a pair of spaced apart guide rollers on opposite sides of said second leg respectively constructed and arranged to ride upon the opposite side of said wall ahead of and behind the location of said first mentioned roller, said first mentioned roller and said pair of guide rollers being adapted cooperatively to support said frame on said wall for movement along the edge thereof, said second leg of said frame having a passage therein intersecting said recess at a position opposite said first mentioned roller, a core slidably mounted in said passage for selective movement toward and away from said first mentioned roller, a traction wheel on said core directly opposite said first mentioned roller, means for forcefully moving said core toward said traction wheel to carry said traction wheel into forceful contact with said opposite side of said wall while said frame is supported upon said wall by said first mentioned roller and said pair of guide rollers, said wall being thereby gripped directly between said first mentioned roller and said traction wheel, means for rotating said traction wheel to propel said frame along said wall on said rollers, and a cutting tool on said frame engageable with said wall for shaving material from said wall during movement of said frame thereon.

5. A traveling tool for shaving material from a wall of metal or the like comprising, a generally C-shaped frame having first and second laterally extending leg portions defining a recess therebetween, said frame being constructed and arranged to receive an edge portion of said wall in said recess, a roller on said first leg adapted to engage and ride on one side of said wall in said recess, two spaced apart pairs of guide rollers respectively mounted on opposite sides of said second leg and respectively arranged to ride upon the opposite side of said wall ahead of and behind the location of said first mentioned roller, said first mentioned roller and said pairs of guide rollers being adapted cooperatively to support said frame on said wall for movement along the edge portion thereof, said second leg of said frame having a passage therein intersecting said recess at a position opposite said first mentioned roller, a core slidably mounted in said passage for selective movement toward and away from said first mentioned roller, a traction wheel on said core directly opposite said first mentioned roller, means for forcefully moving said core toward said traction wheel to carry said traction wheel into forceful contact with said opposite side of said wall while said frame is supported upon said wall by said first mentioned roller and said pair of guide rollers, said wall being thereby gripped directly between said first mentioned roller and said traction wheel, means for rotating said traction wheel to propel said frame along said wall on said rollers, and a cutting tool on said frame engageable with said wall for shaving material from said wall during movement of said frame thereon.

6. The combination set forth in claim 5, including means for simultaneously moving the axial disposition of said pairs of guide rollers with respect to said frame to accommodate walls of different thicknesses.

7. The combination set forth in claim 5, wherein said pairs of guide rollers are respectively mounted on a pair of slides on opposite sides of said second leg, and wherein said combination includes means for simultaneously moving said slides on said second leg to move the axial disposition of said pairs of rollers with respect to said frame to accommodate walls of different thicknesses.

References Cited in the file of this patent

UNITED STATES PATENTS

| | | |
|---|---|---|
| 1,820,056 | Drowns | Aug. 25, 1931 |

FOREIGN PATENTS

| | | |
|---|---|---|
| 715,780 | Germany | Jan. 7, 1942 |
| 755,407 | France | Sept. 4, 1933 |